RECORD TRANSPORT DEVICE

Filed Aug. 15, 1962 4 Sheets-Sheet 1

INVENTER
CASPER L. BARCIA
BY Ronald S. Kransdorf
AGENT

Dec. 20, 1966 C. L. BARCIA 3,293,414

RECORD TRANSPORT DEVICE

Filed Aug. 15, 1962 4 Sheets-Sheet 3

Dec. 20, 1966 C. L. BARCIA 3,293,414

RECORD TRANSPORT DEVICE

Filed Aug. 15, 1962 4 Sheets-Sheet 4

United States Patent Office 3,293,414

Patented Dec. 20, 1966

3,293,414

RECORD TRANSPORT DEVICE

Casper L. Barcia, Briarcliff Manor, N.Y., assignor to International Business Machines Corporation, New York, N.Y., a corporation of New York Filed Aug. 15, 1962, Ser. No. 217,185
11 Claims. (Cl. 235—61.11)

This invention relates to a device for transporting record members.

One of the basic elements of any computing system is the computer's memory. As the applications to which computers are put expand and the problems which they are called upon to solve become more complex, the capacity required of computer memories increases. Memories of trillion-bit capacity are already being discussed, and this is by no means the ultimate memory capacity which will be required.

As the capacity required of a memory increases, the memory's size and cost also increase until a point is reached where such standard memory elements as magnetic cores and magnetic drums are no longer feasible. Present techniques which provide higher storage density and lower cost are stacked magnetic discs, photographic discs, and photographic strips. At present, the potential storage density for the various disc storage techniques has not yet been attained. The reason for this is that the discs have been arranged in a fixed-hub configuration and, therefore, considerable space must be provided between the discs to allow an appropriate transducer to act on each individual disc. Much higher storage densities could be obtained if the discs were freed from the hub-drive, and stacked in storage bins with the space between adjacent discs being only that required to prevent actual physical contact of the disc (physical contact should be avoided since it could cause damage to the information recording media). If the disc was so stored, means would have to be provided for rapidly, simply, and economically selecting a desired disc, and transporting the selected disc from the storage station to a utilization station where it could be spindled and acted upon by an appropriate transducer. Means would, of course, also be required to return a disc to storage when it was no longer required at the utilization station. While an operation similar to that outlined above is presently performed on phonograph discs in juke boxes, the mechanical techniques employed there are far too slow and cumbersome for the memory applications indicated above.

Likewise, with photographic strips, present mechanical retrieval techniques have tended to be relatively slow and cumbersome. Faster, simpler, and more economical transport systems are required before the full potential of this type of storage can be realized.

It is, therefore, a primary object of this invention to provide a rapid, simple, and economical device for transporting record members between a storage station and a utilization station.

Another object of this invention is to provide means for freeing storage discs from fixed hub-drives.

Still another object of this invention is to provide means for selecting one of a plurality of record members stored in a storage bin, for transporting the selected record member to a utilization station, and for returning the selected record member to a storage bin when the record member is no longer needed at the utilization station.

A further object of this invention is to provide a device for transporting record members from a storage station to a utilization station and back to the storage station which device requires no drive means in the transport path.

Another object of this invention is to provide a low-friction transport path for the transport device of the above objects.

A further object of this invention is to provide a transport path of the type mentioned above which will not physically contact the record member and therefore, is capable of transporting the device without damage to the storage media.

A still further object of this invention is to provide a transport system of the type mentioned above which is capable of handling flexible record members without causing buckling thereof.

In accordance with these objects, this invention provides a transport path between a storage station and a utilization station. This path is a low-friction path which is, in the preferred embodiment, pneumatically lubricated. At the storage station, which station may have one or more record members stored therein, an ejector means is provided to eject a selected record member into the transport path. This ejector, which in the preferred embodiment is a pneumatic ejector, imparts a sufficient initial momentum to the member to drive the member along the low-friction transport path to the utilization station without the need for any intermediate drivers. If there is more than one record member at the storage station, means are provided to position the desired record member between the ejector and the transport path prior to the energization of the ejector.

At the utilization station, means are provided to detent the record member in a position to be utilized. This may be accomplished, for example, by a vacuum device which draws the member into an end groove at the utilization station. With circular record members, the utilization station will include a spindle which, when the member is properly positioned, is rotated and clutched into contact with the member, causing the disc to rotate in juxtaposition with an appropriate transducer.

When the record member is no longer required at the utilization station, means are provided to return it to the storage station. This may be accomplished by energizing an ejector, for example a pneumatic ejector, located at the utilization station. As a practical matter, the vacuum detent device previously mentioned, is capable alternatively of applying air pressure to the record member to eject it into the transport path with sufficient momentum to return the member to the storage station. With disc record members it is, of course, necessary to declutch the spindle prior to energizing the ejector. However, with disc record members, it is also possible by using a different mode of operation to return the disc to the storage station without the use of an ejector at the utilization station. This is accomplished by declutching the spindle while the spindle, and therefore the disc, is still rotating. When this is done, the disc rolls back along the transport path to the storage station. Detenting at the storage station may be performed by the ejector by, for example, causing the pneumatic ejector to apply vacuum to the record member.

In the preceding discussion, it has been indicated that many of the operations may be performed pneumatically. Performance of these functions in this manner gives rise to several advantages. With pneumatic elements, there are no mechanical parts contacting the record members and therefore, no danger of scratching or otherwise damaging the recording media. Pneumatic devices also eliminate intermediate mechanical carriers for the drive impulses, acting directly on the record member, and therefore, are faster. Since the compressor is the only moving part in a pneumatic system, there are fewer parts to wear out and the system is therefore, more reliable. This higher reliability leads to low maintenance cost and therefore to far cheaper operation. For these, and other reasons, the preferred embodiments of the invention illustrated and described in the following sections are all the pneumatic embodiments.

The foregoing and other objects, features and advantages of the invention will be apparent from the following more particular description of preferred embodiments of the invention, as illustrated in the accompanying drawings.

Figure 1:
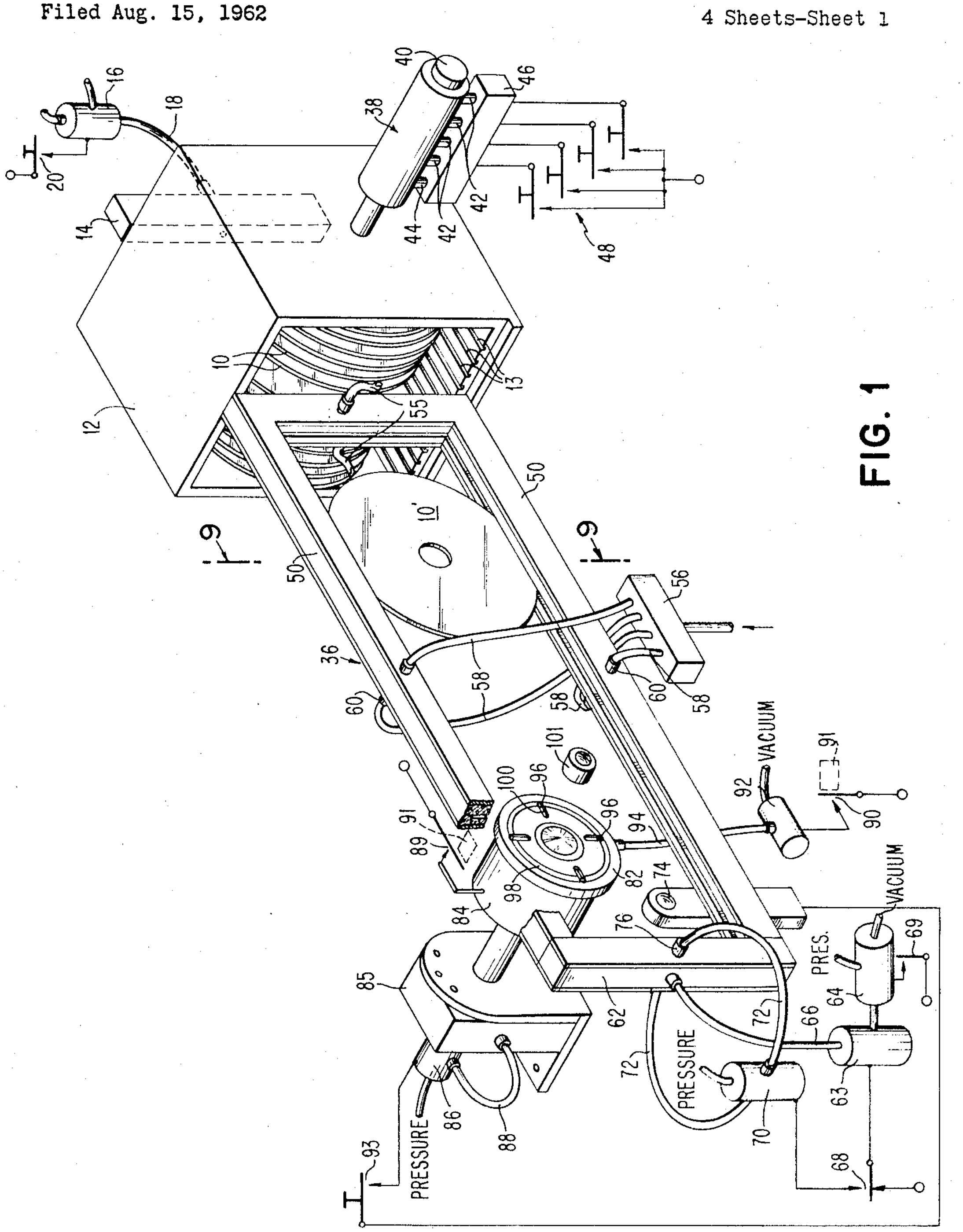
FIG. 1 is a projetion view of one embodiment of the invention.
Figure 2:
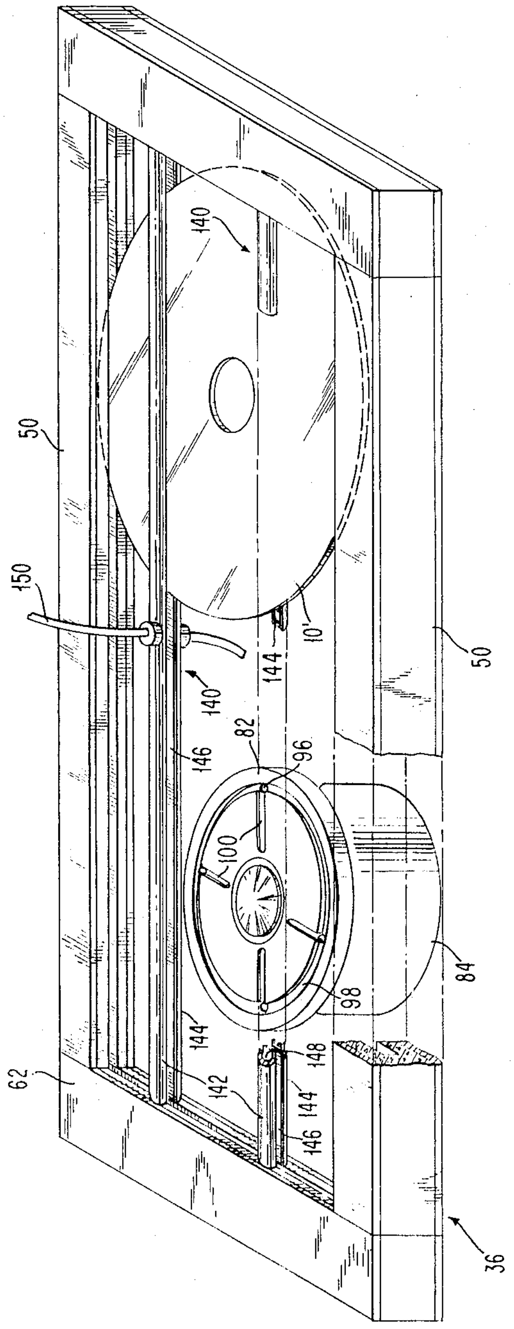
FIG. 2 is a projection view of another embodiment of the invention.

Referring now to FIGS. 1 and 2, there are shown exemplary embodiments of the invention wherein the record member used is a flexible record disc. However, the present invention is equally useful with rigid or flexible records. Also, for the purposes of this invention, it does not matter whether photographic, magnetic, or some other storage media is used on the surface of the disc.

The embodiment of the invention shown in FIGS. 1 and 2, differ from each other primarily in the orientation of the discs 10 and of the hardware for storing, transporting, and utilizing these discs. In FIG. 1 the discs and other hardware are oriented in a vertical plane whereas, in FIG. 2, these elements are oriented in a horizontal plane. While, for the purposes of this invention, the elements may be oriented in either plane, there are some advantages, which will be pointed out later, in orienting the elements in the vertical plane. For this reason, the detailed description of the invention to follow will be with respect to FIG. 1 only and it will be understood that, except where otherwise indicated, what is said of the vertically oriented embodiment of FIG. 1, will apply equally to the horizontally-oriented embodiment of FIG. 2.

In the vertically-oriented embodiment of the invention shown in FIG. 1, a plurality of discs 10 are stored side by side in a storage bin 12. Each disc is stored in an upright position in an individual compartment 13 resting on its circular edge, and the spacing between the discs is extremely small, being only sufficient to prevent actual physical contacts of the discs. A spacing of as little as 40 mils between discs 8 mils thick has been found to be sufficient for this purpose and it has been estimated that a spacing as small as 20 mils would give satisfactory results. With the discs oriented in a horizontal position, as shown in FIG. 2, there is a greater tendency for the discs to sag in the middle and, therefore, a greater spacing between discs is required to prevent contact.

At the rear of the storage bin, at a position normally adjacent to the left-most storage compartment, is an ejection and positioning device 14 for selectively applying air pressure or vacuum to a selected compartment. In the preferred embodiment, this device normally causes vacuum to be applied to a compartment 13 through a standard electrically operated 3-way valve 16, line 18 and device 14. The valve 16 has a vacuum input which is normally connected to line 18 and an air input which is normally blocked by a contact inside the valve. When switch 20 is closed, the contact in valve 16 is transferred causing air pressure to be applied to the selected compartment over the same path. The switch 20 and all other switches in FIG. 1 are illustrated as manually operated, however, they could, for example, be relay contacts which are energized under control of a computer or other information utilization device.

Figure 3:
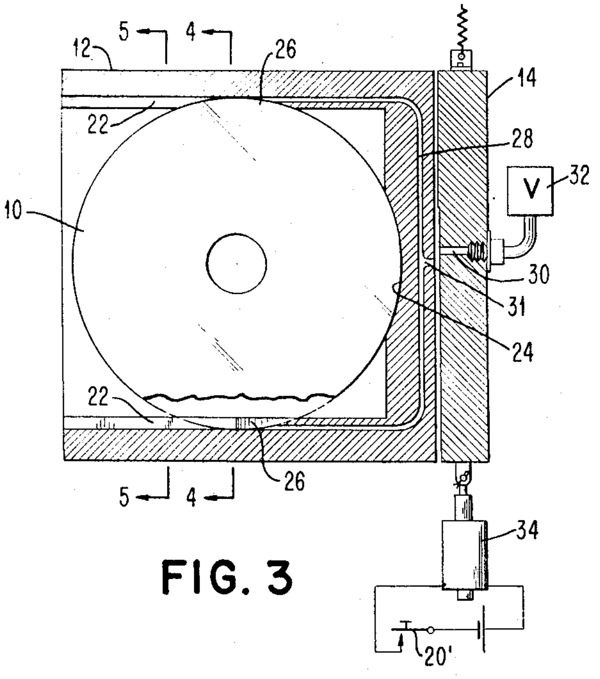
FIG. 3 is a detailed sectional view of an ejector mechanism suitable for use at the storage station in either FIG. 1 or FIG. 2.
Figure 4:
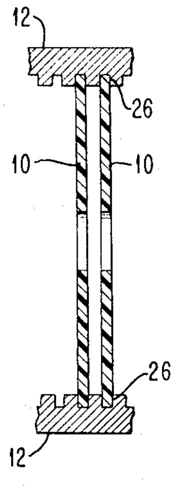
FIG. 4 is a sectional view along the line 4—4 of the ejector shown in FIG. 3.
Figure 5:
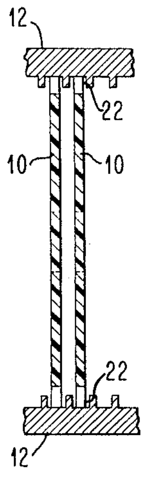
FIG. 5 is a sectional view of the same ejector taken along the line 5—5 in FIG. 3.

FIGS. 3–5 show a storage compartment 13 in more detail. As seen in FIG. 3, each disc 10 rests in grooves 22 in the upper and lower surfaces of a compartment, and in a groove 24 in the rear of the compartment. These grooves, or tracks, as they are also called, support the disc in an upright position. As can be seen from the bottom track in FIG. 3 and from FIG. 4, the grooves 22 are necked down in the area 26 to a thickness which is infinitesimally greater than that of the disc itself so that the disc fits very tightly therein. It has been found that for a disc 8 mils thick, an 11 mil thickness in area 26 is quite satisfactory. This contact of the disc face with the compartment surface does not cause any damage to the recording media since no information is recorded on the part of the disc that close to the edge. As seen from FIG. 5, the thickness of the groove 22 in all areas of the groove except the area 26, is somewhat greater than the thickness of the disc. 20 mils has been found to be a suitable thickness for the portion of the groove.

An air channel 28 is provided behind each compartment 13 to convey either air or vacuum from device 14 to groove area 26. FIG. 3 shows an alternate embodiment for obtaining a vacuum in channel 28 which is somewhat different from that shown in FIG. 1. Here, an orifice 30 of the element 14 is normally positioned as shown in FIG. 3, causing air from valve 32 to be blown across the face of the orifice 31 to create a vacuum in channel 28. When it is desired to eject a disc 10, switch 20' is closed to energize solenoid 34, causing device 14 to be moved to a position with channel 30 aligned with input orifice 31.

Figure 8:
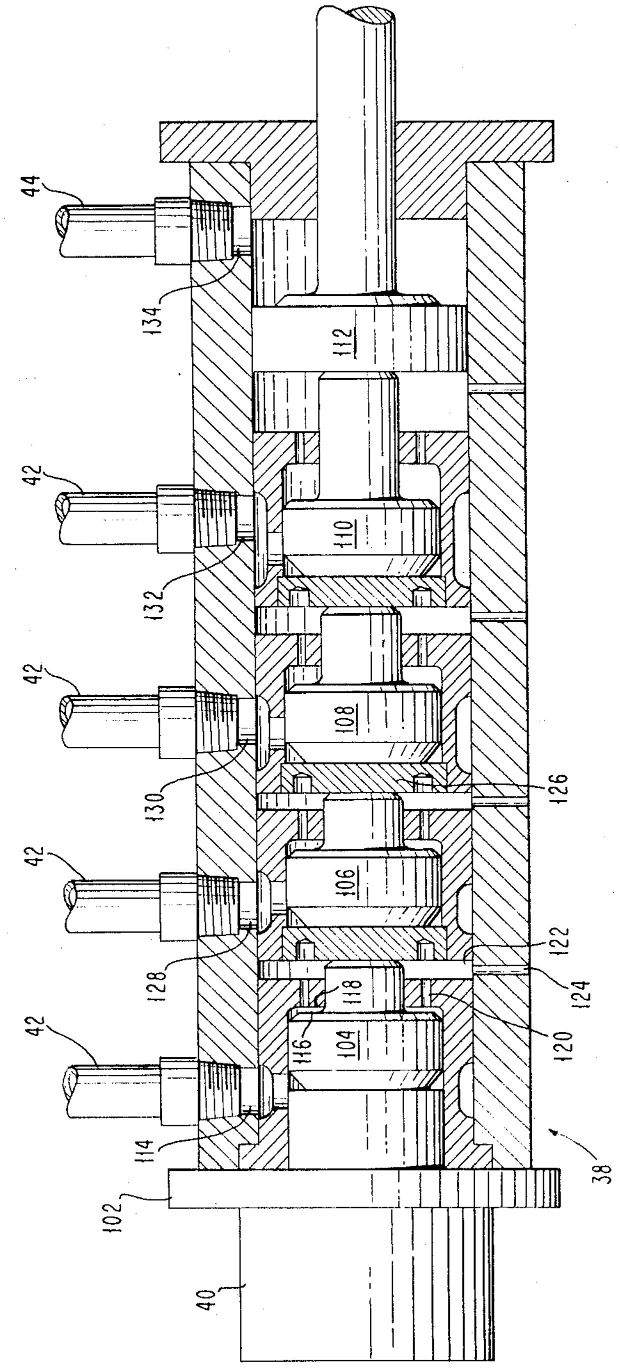
FIG. 8 is a sectional view of a piston adder suitable for use with the embodiment of the invention shown in FIG. 1.

Disc transport path 36, FIG. 1, is positioned between bin 12 and a utilization station. This path is in line with air-supply device 14. This disc 10' in bin 12, which it is desired to transport to the utilization station at a given time, is positioned in alignment with air-supply device 14 and transport path 36 by moving bin 12 in the horizontal plane under control of piston adder 38. The piston adder is fixed at one end to bin 12 and at the other end to a fixed base reference 40. The piston adder is capable of moving the bin precise incremental distances under control of air pressure applied to one or more of input tubes 42. A piston adder having four input tubes 42 as shown is capable of positioning a bin 12 having sixteen compartments 13. If a bin having more compartments was used, a larger piston adder having more input tubes would be required. A tube 44 supplies a bias pressure for damping purposes and for restoring the pistons of the adder and the attached bin 12 to their initial positions. Solenoid valves 46 are operated under control of switches 48 to apply air pressure to a proper one or more of the lines 42 to advance bin 12 to the proper position to select the desired disc. A pneumatic piston adder suitable for use as a piston adder 38 is shown in FIG. 8 and described in detail later.

The two tracks 50 of the transport path 36, are pneumatically lubricated so as to present a low-friction path to the moving disc. In a preferred embodiment of the invention, this is accomplished by using a track structure such as that shown in FIG. 9. The inner faces 52 of the tracks 50 are manufactured of sintered bronze or of some other sintered material. A separate manifold 54 runs along each side of each track 50 and is supplied with air pressure from an air pressure source 56 (FIG. 1) through tubes 58 and orifices 60. Due to pressure built up in the manifolds 54 air passes uniformly through the sintered surfaces 52 to apply equal and opposite air pressures to the adjacent edges of the disc 10′ located in the track. Lubricating air may similarly be applied to the front of transport path 36 by tubes 55. The pressurized thrust-bearing track which is thus formed, provides a low-friction path for the disc to travel along and also provides a stable pre-loaded system which allows for a minimum of vibration and flutter in the disc as it is being transported. The tracks 50 also provide a means for transporting a record member without physical contact with the faces thereof.

Figure 6:
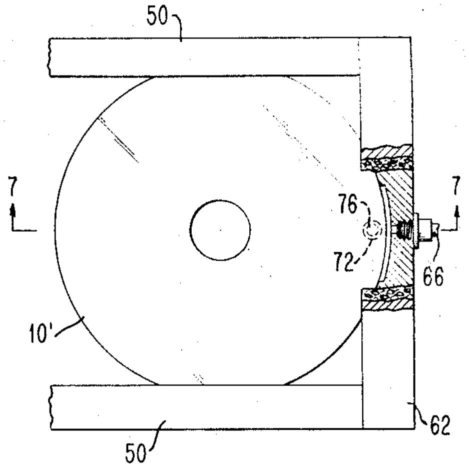
FIG. 6 is a detailed view of an ejector device, suitable for use at the utilization station in either FIG. 1 or FIG. 2.
Figure 7:
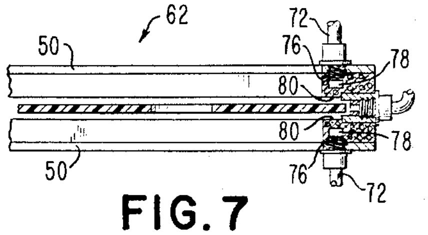
FIG. 7 is a sectional view of the ejector shown in FIG. 6, the view being taken along the line 7—7 in FIG. 6.

At the utilization-station end of the tracks 50, there is a combination disc detenting and ejecting device 62 which is shown in more detail in FIGS. 6 and 7. Referring to FIG. 6, it is seen that the disc is again supported on its circular edge by tracks in the upper, lower, and back surface of the device 62. However, referring to FIG. 7, it is seen that the pressure fit is now at the back surface of the disc only rather than at its upper and lower edges. Vacuum is ordinarily applied to the rear of device 62 through 3-way valve 64 (FIG. 1), 63, and tube 66. A contact 68 is normally connected to valve 63 (as shown) to energize this valve. When a disc 10′ arrives at the utilization station, the contact, which is preferably operated in a manner to be indicated later, is transferred to de-energize valve 63 and to energize valve 70 allowing air pressure to be applied to lines 72.

The arrival of the disc at the utilization station may be sensed by a suitable sensing device 74. The sensing device may be a photoelectric cell which is normally energized by a light source (not shown) but which is cut off from the light source by the disc 10′ when it is properly positioned at the utilization station. With photographic discs which are to some extent transparent, a different sensing device may be used such as a reed or diaphragm contact which is normally held in one position by a small air jet and which returns to a second position when separated from the air jet by the disc arriving at the utilization station.

The air pressure applied to lines 72 is passed through orifices 76 to separate manifolds 78 located in device 62 on opposite sides of the disc. The surfaces 80 of the device 62 are of a sintered metal and, when air pressure is applied to manifolds 78, a pressurized aid bearing is formed between the disc and the pressure-fit surfaces 80 to allow a low-friction path in which the edge of the disc can rotate. But for the provision of this pressurized air bearing, the pressure-fit formed at the back surface of device 62 would prevent, or at least greatly hamper, the rotation of the disc.

A spindle 82 is also located at the utilization station. The spindle 82 is caused to rotate by a motor 84. The spindle is normally in a retracted position but is clutched into an extended position by a pneumatic clutch 85 when a disc 10′ is located at the utilization station. The pneumatic clutch is energized by air applied to it through valve 86 and tube 88. The valve 86 may be manually controlled, or it may be operated in response to a signal from sensing device 74. A switch 93 is provided to open valve 86 deenergizing clutch 85 to retract the spindle. The motor 84 is turned on by a switch 89 which may be manually operated but is, in the preferred embodiment of the invention, transferred by the movement of the spindle from its retracted position to its extended position. The contact 68 is likewise preferably transferred under control of the spindle movement. When the spindle is clutched into contact with the disc, a contact 90 is closed causing vacuum to be applied through valve 92 and tube 94 to the underside of the spindle. This vacuum is applied to ducts 96 in the face of the spindle and is distributed over the surface of the spindle by circular channel 98 and radial channels 100. The vacuum on the face of the spindle tends to hold the disc firmly against it so that the disc rotates with the spindle without any slippage.

A coil 91 is provided to open contacts 89 and 90 while the spindle is still in its extended position.

As the disc rotates, it is acted upon by a suitable transducer element 101 the nature of which is dependent upon the particular recording medium.

*Piston adder*

Before describing the operation of the device shown in FIG. 1, the piston adder 38 shown in detail in FIG. 8 will be described briefly. This device has a base 102 which is firmly fixed to a base reference 40, four adder-pistons 104, 106, 108, and 110, and an output piston 112 which is also used for restoring purposes. The device shown in FIG. 8 is capable of making a total excursion of 0.64″ in increments of 0.04″. Air pressure applied by a tube 42 (FIG. 1) to duct 114 will cause piston 104 to move from the position shown to a position where its upper edges 116 contact the wall 118 of its cylinder. The total excursion of the piston is precisely 0.04″. Air trapped between the pistonand the cylinder is allowed to escape through vents 120 cylinder 122 and vent 124. This excursion of piston 104 causes the reference plate 126 for the cylinder of piston 106, and therefore, the entire chamber for this cylinder, to be moved by an increment of 0.04″. Air pressure applied to duct 128 would cause cylinder 106 to move a total distance of 0.08″ in its cylinder. Similarly, air applied to ducts 130 and 132 would cause piston 108 to move 0.16″ and piston 110 to move 0.32″ respectively. The movement of each piston causes each cylinder located to the right of it to move an equal distance and the total excursion of the pistons is transmitted to the external device, the bin 12 in this instance, by piston 112. Continuous air pressure applied to duct 134 through tube 44 biases piston 112 to the left to provide damping for the movement of the other pistons and to return the pistons to their normal position when air is removed from their respective input ducts. In the operation of this adder, it does not matter whether air is applied to the input ducts in series or in parallel, the final effect is the same.

*Operation*

One complete operating cycle of the device shown in FIG. 1 will now be described. In the normal bin position, the left-most disc is adjacent to ejector device 14. Assume that it is desired to select the right-most disc in bin 12. To accomplish this, all the switches 48 are closed, causing air pressure to be applied through valves 46 and tubes 42 to all the input ducts of piston adder 38. Referring to FIG. 8, it is seen that this causes all of the adder-pistons 104–110 to be moved to the right in their respective cylinders, causing a total excursion of the piston 112 of 0.64″. Therefore, assuming a spacing of 0.04″ between discs, and 16 discs in the bin, this positions the right-most disc in bin 12 between the device 14 and the transport path 36. Switch 20 is now momentatrily closed to transfer the contact in 3-way valve 16, causing a jet of air to be passed through valve 16, tube 18, and device 14 to channel 28 (FIG. 3) in the rear of bin 12. The pressure fit of disc 10′ in portion 26 of groove 22 prevents the immediate escape of air from this portion of the groove, resulting in a pressure build-up behind the disc. When this pressure becomes great enough, the disc 10′ is shot out into transport path 36 with a sufficient initial momentum to carry it along this air-lubricated low-friction path to the utilization station. The speed of the disc is great enough so that there is little of any relative velocity between the air being applied o the channel 28 and the disc, as the disc leaves its compartment 13, minimizing flutter and vibration.

The initial momentum imparted to the disc by the ejection mechanism is sufficient to carry it into contact with device 62 at the utilization station. At this time, contact 68 and the contact in 3-way valve 64 are in their normal positions (i.e. switch 69 is open), causing vacuum to be applied through valves 64 and 63 and tube 66 to the rear surface of device 62. This draws the disc 10' into contact with the sintered surfaces 80 (FIG. 7) and brings the disc to a precisely positioned stop over a short distance interval. The vacuum applied to the rear of device 62 also prevents disc 10 from rebounding when it hits device 62. When sensing device 74 detects the presence of the disc at the utilization station, it energizes valve 86 to cause air pressure to be applied through tube 88 to clutch 85 driving spindle 82 into contact with the disc 10'. The movement of the spindle transfers contacts 68, 90 and 91 which (*a*) deenergizes valve 63 and energizes valve 70 causing air pressure to be applied through tubes 72 and orifices 76 to manifolds 78; (*b*) cause vacuum to be applied through valve 92 and tube 94 to the face of the spindle; and (*c*) cause motor 84 to start rotating, respectively. As mentioned previously, the air flow through the sintered metal faces 80 forms a cushion of air which allows disc 10' to rotate between the pressure-fitted faces 80 of device 62.

After utilization of the disc 10', it is returned to bin 12 by one of two methods. For the first method, coil 91 is energized, opening contacts 89 and 90 to turn off motor 84 and to remove vacuum from the faces of the spindle. This releases the disc from the spindle. Contact 93 is then opened to turn off valve 86 removing pressure from line 88. This declutches the spindle to its retracted position. If a positive retraction of the spindle is desired, a 3-way valve could be used for valve 86 and the contact therein transferred to apply vacuum to the chamber of clutch 85 thereby driving the spindle to a retracted position. The spindle returning to its retracted position, transfers contact 68 back to the position shown in FIG. 1. Finally, switch 69 is closed to transfer the contact inside 3-way valve 64, causing air pressure to be applied through line 66 to the rear side of device 62. The close fit between disc 10' and surfaces 80 prevents this air from escaping around the edges of the disc, causing a pressure build-up behind the disc which pressure ejects the disc into transport path 36 with sufficient momentum to drive it back into bin 12. Prior to this time, a switch 20 was opened so that 3-way valve 16 is in its normal position causing vacuum to be applied to channel 28. This vacuum draws disc 10' into the pressure fitted portion 26 of track 22 (FIG. 3) to properly position the disc in the storage bin. The disc is now in position to be ejected the next time it is required at the utilization station.

The above method of returning the record member to the storage bin is useful whether the track is oriented in a vertical position as shown in FIG. 1 or in a horizontal position as shown in FIG. 2 and may be used with a circular record member or with a record member having some other geometric configuration such as a rectangular strip. An alternative method of returning the disc to the storage bin is useful particularly when the track is oriented in a vertical position as shown in FIG. 1 and only when a circular record member is used. For the configuration shown in FIG. 1, with the storage bin 12 positioned to the right of the utilization station, the spindle, and therefore the disc, must be rotated in a clockwise direction. For this alternative return-method, the circuit is modified in an obvious manner, to cause contacts 90 and 93 to be opened simultaneously. This retracts the spindle and frees the disc from the spindle while the disc is still rotating in a clockwise direction, allowing the momentum of the disc to carry the disc along the low-friction tracks 50 to the storage bin 12 where it is positioned and held in the same manner as described previously for the first method of returning the disc.

While the preceding detailed description of the invention was with reference to an embodiment in which the discs and other elements are oriented in a vertical plane, it is, as was mentioned previously, completely within the contemplation of this invention to orient these elements in a horizontal plane as well. The alternative embodiment of the invention shown in FIG. 2 is included to emphasize this point. Since, in all but one particular, the operation of this embodiment of the invention is identical to that of the embodiment of the invention shown in FIG. 2, most of the valves, tubes, switches, and other controls have been omitted from FIG. 2 and the description of it will be restricted to the point of difference. Also, for the sake of simplicity, only a single disc has been shown as being stored at the storage station. A bin 12 similar to that shown in FIG. 1 but horizontally oriented could, of course, be used.

Figure 9:
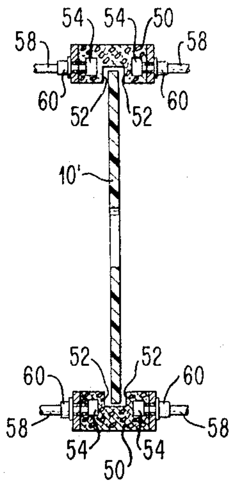
FIG. 9 is a sectional view of a track structure suitable for use in the embodiments of the invention shown in FIGS. 1 and 2.

For large discs, it has been found, particularly with a horizontally oriented system, that additional support is needed for the disc while it is traveling in transport path 36. This may be supplied by providing one or more air-lubricated rails positioned intermediate tracks 50. FIG. 2 shows two such rails 140 which are each spaced one-third of the way in from their adjacent track 50. These rails are similar to the tracks 50 except that they are made of an upper and a lower part, 142 and 144 respectively, which are completely separated from each other with the disc passing completely between them rather than of a single part with a cut-out groove in which the disc fits. The inner surfaces 146 of these rails are of sintered material the same as the surfaces 52 (FIG. 9). Air is continuously applied to manifolds 148 in these rails through tubes 150.

It should be noted that, while in FIGS. 1 and 2 the storage members are discs, the hardware shown for record member storage, ejection, transport, detent and positioning, and ejection-return are all equally suitable for use with members having some other physical configuration such as for example, rectangular storage strips. For this sort of record member spindling would, of course, not be required.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A record member handling device comprising: means for transporting a circular record member from a storage station to a utilization station;

a pneumatically lubricated path between said storage station and said utilization station;

means at said storage station for applying pneumatic pressure to said member to eject it into said lubricated path with sufficient momentum to carry said member along said lubricated path to said utilization station;

and vacuum means for positively positioning said member at said utilization station.

2. A device of the type described in claim 1 including means selectively operable for causing said position means to eject said member into said lubricated path with sufficient momentum to return said member along said path to said ejection station.

3. A device of the type described in claim 1 including means selectively operable for causing said ejection means to position said returned member at said storage stations.

4. A device of the type described in claim 1 wherein said storage station includes means for storing a plurality of record members;

and means for positioning a selected member at said ejection means for ejection into said path.

5. A record member handling device comprising: means for transporting a circular record member from a storage station to a utilization station;

a path between said storage station and said utilization station, said path having means to support said member therein in a vertical position on said member's peripheral edge;

ejection means for ejecting said member from said storage station into said path with sufficient momentum to carry said member along said path to said utilization station;

means for positively detenting said member in a position to be utilized;

and means including in part said detenting means, for returning said member to said storage station.

6. A circular record member handling apparatus comprising:

a record storage station;

a utilization station;

a low-friction path between said storage station and said utilization station, said path having means for supporting said member therein in a vertical position on the member's circular edge;

means at said storage station for ejecting said member into said path with sufficient momentum to carry said member along said path to said utilization station;

a spindle at said utilization station, means for rotating said spindle;

means for positioning said member adjacent to said spindle;

and means for clutching said spindle into contact with said positioned member whereby said member is caused to rotate with said spindle and for declutching said spindle while said spindle is still rotating whereby the momentum of the rotating member causes said member to roll along said path to said storage station.

7. A circular record member handling apparatus comprising:

a record storage station;

a utilization station;

a pneumatically lubricated path between said storage station and said utilization station;

means at said storage station for ejecting said member into said path, the initial momentum imparted to said member by said ejection means being sufficient to carry said member along said path to said utilization station;

a spindle at said utilization station, means for rotating said spindle;

means for positively positioning said member adjacent to said spindle; means for clutching said spindle into contact with said member, whereby said member is caused to rotate with said spindle;

and restoring means for declutching said spindle and for driving said member back along said path to said storage station when said member is no longer needed at said utilization station.

8. A device of the type described in claim 7 wherein said storage station includes means for storing a plurality of record members at said storage station;

and means for positioning a selected member at said ejecting means for ejection into said path.

9. Circular record member handling apparatus comprising:

a record storage station;

a utilization station;

an air-lubricated path between said storage station and said utilization station; pneumatic means at said storage station for ejecting said member into said path with sufficient momentum to carry said member along said path to said utilization station;

a spindle to said utilization station, means for rotating said spindle;

means, including a vacuum device, for positively positioning asid member adjacent to said spindle;

means for clutching said spindle into contact with said member, whereby said member is caused to rotate with said spindle; and restoring means for returning said member to said storage station, said restoring means including means for clutching said spindle out of contact with said member, means for applying air pressure to said vacuum device to eject said member into said path, and means for applying vacuum pressure to said pneumatic ejector means to position said member in said storage station.

10. A device of the type described in claim 9 characterized by the inclusion of:

vacuum means operating on the underside of said spindle, and means for transmitting the vacuum through said spindle, whereby the record member is held non-slipping in contact with the face of the spindle when the spindle is clutched into contact therewith.

11. A device of the type described in claim 9 wherein said air-lubricated path includes:

air-lubricated track means for supporting the edges of said record member;

and air-lubricated rail means positioned intermediate said track means for providing additional support to said record member.

References Cited by the Examiner

UNITED STATES PATENTS

| | | | |
|---|---|---|---|
| 766,213 | 8/1904 | Atwood | 302—2 |
| 1,951,820 | 3/1934 | Emerson | 243—19 |
| 2,890,913 | 6/1959 | Miskel | 302—2 |
| 3,034,645 | 5/1962 | Groppe | 209—111.5 |
| 3,042,454 | 7/1962 | Eissmann | 302—2 |
| 3,103,850 | 9/1963 | Khoury | 88—24 |

DARYL W. COOK, *Acting Primary Examiner.*

R. COUNCIL, *Assistant Examiner.*